(12) United States Patent
Jeong et al.

(10) Patent No.: US 10,569,807 B2
(45) Date of Patent: Feb. 25, 2020

(54) SIDE SILL MOLDING FOR CAR AND MANUFACTURING METHOD THEREOF

(71) Applicants: Hyundai Motor Company, Seoul (KR); Kia Motors Corporation, Seoul (KR); LG Hausys, Ltd., Seoul (KR)

(72) Inventors: Yong-Won Jeong, Gwangmyeong-si (KR); Seung-Mok Lee, Osan-si (KR); Sun-Jun Kwon, Cheongju-si (KR); Chun-Ho Park, Cheongju-si (KR); Guo-Dong Jeong, Ulsan (KR); Hyun-Seung Hwang, Hwaseong-si (KR)

(73) Assignees: Hyundai Motor Company, Seoul (KR); Kia Motors Corporation, Seoul (KR); LG Hausys, Ltd., Seoul (KR)

( * ) Notice: Subject to any disclaimer, the term of this patent is extended or adjusted under 35 U.S.C. 154(b) by 6 days.

(21) Appl. No.: 15/829,198

(22) Filed: Dec. 1, 2017

(65) Prior Publication Data

US 2018/0178847 A1 Jun. 28, 2018

(30) Foreign Application Priority Data

Dec. 23, 2016 (KR) .................. 10-2016-0177838

(51) Int. Cl.
| | | |
|---|---|---|
| *B62D 25/02* | (2006.01) | |
| *B29C 45/17* | (2006.01) | |
| *B60R 13/04* | (2006.01) | |
| *B29C 45/33* | (2006.01) | |
| *B29L 31/30* | (2006.01) | |

(52) U.S. Cl.
CPC ........ *B62D 25/025* (2013.01); *B29C 45/1704* (2013.01); *B29C 45/33* (2013.01); *B60R 13/04* (2013.01); *B29L 2031/3005* (2013.01); *B60R 2013/046* (2013.01); *B60Y 2410/122* (2013.01)

(58) Field of Classification Search
CPC . B62D 25/025; B60R 13/04; B60R 2013/046; B29C 45/33; B29C 45/1704; B29L 2031/3005; B60Y 2410/122
USPC ......................................................... 296/209
See application file for complete search history.

(56) References Cited

U.S. PATENT DOCUMENTS

| | | | | |
|---|---|---|---|---|
| 6,171,543 | B1 * | 1/2001 | Hirose | ............... B29C 45/1704 264/572 |
| 7,159,933 | B2 * | 1/2007 | Yamamoto | ............... B60R 3/00 296/209 |
| 2004/0185223 | A1 * | 9/2004 | Yamamoto | .......... B29C 45/1704 428/99 |
| 2005/0218700 | A1 * | 10/2005 | Yamamoto | ............. B60R 13/04 296/209 |

(Continued)

FOREIGN PATENT DOCUMENTS

| | | |
|---|---|---|
| JP | 07032417 A | 5/1995 |
| KR | 100171309 B1 | 3/1999 |

(Continued)

*Primary Examiner* — Gregory A Blankenship
(74) *Attorney, Agent, or Firm* — Slater Matsil, LLP

(57) ABSTRACT

A side sill molding may include a front plate configured to have a length corresponding to a length of a side sill, a top plate configured to be connected to an upper end of the front plate, a bent part configured to be connected to the top plate and have a clip part formed at an inner side thereof, and a rib configured to connect a lower end of the clip part and a preset portion of the front plate.

12 Claims, 13 Drawing Sheets

(56) References Cited

U.S. PATENT DOCUMENTS

| | | | | |
|---|---|---|---|---|
| 2006/0066139 A1* | 3/2006 | Futatsuhashi | B60R 13/04 | 296/209 |
| 2006/0145516 A1* | 7/2006 | Yamamoto | B60R 3/00 | 296/209 |
| 2006/0154023 A1* | 7/2006 | Maki | B29C 45/0055 | 428/122 |
| 2006/0267381 A1* | 11/2006 | Cave | B60R 13/0206 | 296/209 |
| 2007/0190294 A1* | 8/2007 | Yamamoto | B29C 33/44 | 428/174 |
| 2009/0167010 A1* | 7/2009 | Rompage | B60R 13/04 | 280/847 |
| 2010/0212252 A1* | 8/2010 | Chou | B60R 13/04 | 52/716.5 |
| 2011/0027522 A1* | 2/2011 | Kubo | B60R 13/04 | 428/99 |
| 2011/0140482 A1* | 6/2011 | Palmer | B60R 13/04 | 296/209 |
| 2013/0009425 A1* | 1/2013 | Flajnik | B62D 35/008 | 296/209 |
| 2013/0302585 A1* | 11/2013 | Lobo | B29C 44/105 | 428/220 |
| 2014/0035270 A1* | 2/2014 | Inoue | B62D 25/18 | 280/851 |
| 2016/0257347 A1* | 9/2016 | Palmer | B62D 25/025 | |
| 2017/0305469 A1* | 10/2017 | Iyoshi | B62D 25/025 | |
| 2018/0154753 A1* | 6/2018 | Katayama | B60R 13/04 | |
| 2018/0154844 A1* | 6/2018 | Katayama | B60R 13/06 | |
| 2018/0178847 A1* | 6/2018 | Jeong | B29C 45/1704 | |
| 2018/0346033 A1* | 12/2018 | Watanabe | B62D 25/025 | |

FOREIGN PATENT DOCUMENTS

| | | |
|---|---|---|
| KR | 20010037061 A | 5/2001 |
| KR | 1020050048067 A | 5/2005 |
| KR | 20160050232 A | 5/2016 |

* cited by examiner

SIDE SILL MOLDING FOR CAR AND MANUFACTURING METHOD THEREOF

CROSS-REFERENCE TO RELATED APPLICATIONS

This application claims priority to Korean Patent Application No. 10-2016-0177838, filed on Dec. 23, 2016, which application is hereby incorporated herein by reference.

TECHNICAL FIELD

Exemplary embodiments of the present invention relate to a side sill molding for a car and a manufacturing method thereof.

BACKGROUND

Generally, doors are provided at side surfaces of a vehicle, such that a passenger may enter into and exit from the vehicle by opening and closing a door.

However, since the side sill is frequently applied with an impact from outside for various reasons such as collision, etc. when a user enters or exits, there are problems in that the side sill is easily damaged, and since non-smooth portions such as connection portion are exposed to the outside, an appearance deteriorates. In order to solve the problems, a side sill molding is coupled to an outer side of the side sill.

Referring to FIGS. 1A to 1D, a side sill molding 10 according to the related art forms a mounting pocket portion for forming a clip part 13 therein by using a slide core 17 as shown in FIG. 1D. However, as shown in FIGS. 1B and 1D, since lower end ribs 11 and 19 of the pocket portion are positioned at an inner surface of a front plate of the side sill molding 10, unevenness of the appearance of the side sill molding 10 occurs due to stress of the slide core 17 at the time of injection molding, and shrinkage deformation of the side sill molding 10 after the injection molding.

A separate bracket 15 is fused to the inner surface of the side sill molding 10 as shown in FIG. 1C in order to solve the problem of unevenness of appearance of a product, but in this case, material costs for manufacturing and coupling the separate bracket 15 are increased, and a weight of the side sill molding is increased.

Korean Patent Laid-Open Publication No. 10-2005-0048067 discloses subject matter related to subject matter disclosed herein.

SUMMARY

Exemplary embodiments of the present invention relate to a side sill molding for a car and a manufacturing method thereof, and more particularly, to a side sill molding for a car and a manufacturing method thereof that may decrease unevenness of appearance of a side sill molding by forming a rib connecting a lower end of a clip fixing part and a gas channel part.

An embodiment of the present invention is directed to a side sill molding for a car and a manufacturing method thereof that may decrease unevenness of appearance of the side sill molding, reduce material costs, and decrease a weight of the side sill molding.

In accordance with an embodiment of the present invention, a side sill molding includes a front plate configured to have a length corresponding to a length of a side sill. A top plate is configured to be connected to an upper end of the front plate. A bent part is configured to be connected to the top plate and have a clip part formed at an inner side thereof. A rib is configured to connect a lower end of the clip part and a preset portion of the front plate.

The rib may be curved at a preset angle from the lower end of the clip part and extend to a portion where the front plate and the top plate meet each other.

The side sill molding may further include a gas channel part having a hollow part formed therein in a length direction of the side sill.

The gas channel part may include a first gas channel part formed at a portion where the front plate and the top plate meet each other.

The gas channel part may include a second gas channel part formed at the bent part.

The first gas channel part may include an inner side plate formed to be spaced apart from the front plate by injected gas, and a lower side plate connecting a lower end of the inner side plate and the front plate.

One end of the rib may be connected to a lower portion of the inner side plate.

One end of the rib may be connected to the lower side plate.

The clip part may be directly connected from the inner side plate.

In accordance with another embodiment of the present invention, a manufacturing method of a side sill molding includes forming a side sill molding mold, forming a slide core between the side sill molding mold, forming a cooling pipe in a central portion of the slide core, and forming a gas channel part.

In the forming of the gas channel part, a hollow part of the gas channel part may be formed by injecting gas from one end of the side sill molding after injection-molding the side sill molding.

The hollow part may be formed in a length direction of the side sill molding.

DETAILED DESCRIPTION OF ILLUSTRATIVE EMBODIMENTS

Terms and words used in the present specification and claims are not to be construed as a general or dictionary meaning but are to be construed as meaning and concepts meeting the technical ideas of the present invention based on a principle that the inventors can appropriately define the concepts of terms in order to describe their own inventions in best mode. Therefore, the configurations described in the embodiments and drawings of the present invention are merely most preferable embodiments but do not represent all of the technical spirit of the present invention. Thus it should be understood that there may exist various equivalents and modifications for substituting those at the time of filing this application. Moreover, detailed descriptions related to well-known functions or configurations will be omitted in order not to unnecessarily obscure the gist of the present invention. Hereinafter, preferred embodiments of the present invention will be described in detail with reference to the accompanying drawings.

Figure 1A:
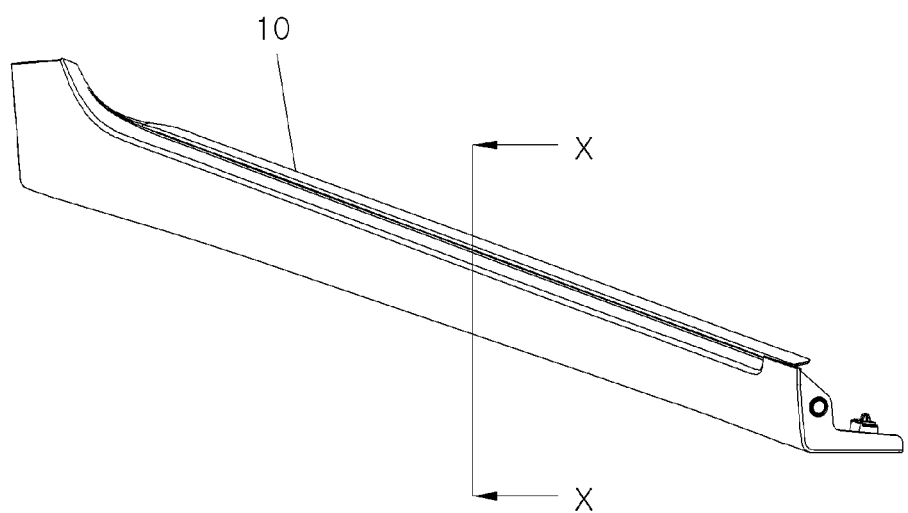
FIGS. 1A to 1D are a perspective view and cross-sectional views showing a side sill molding for a car according to the related art, respectively.
Figure 1B:
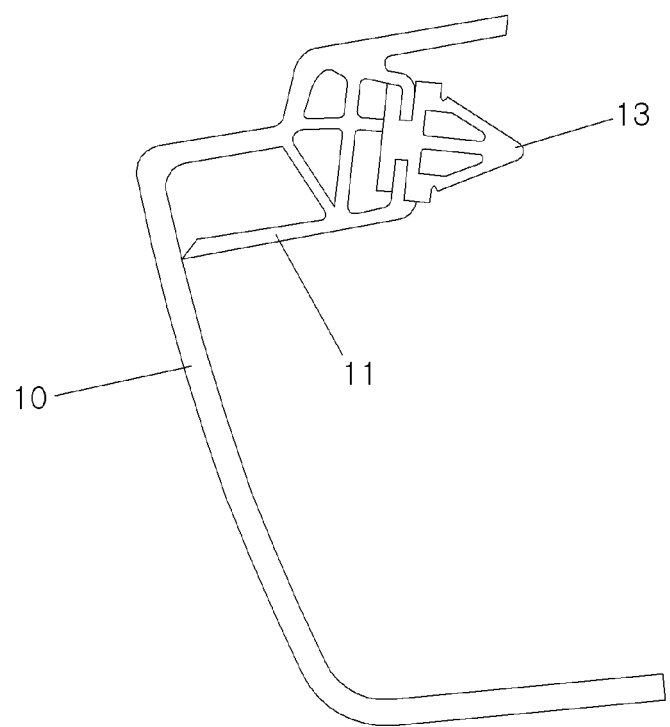
Figure 1C:
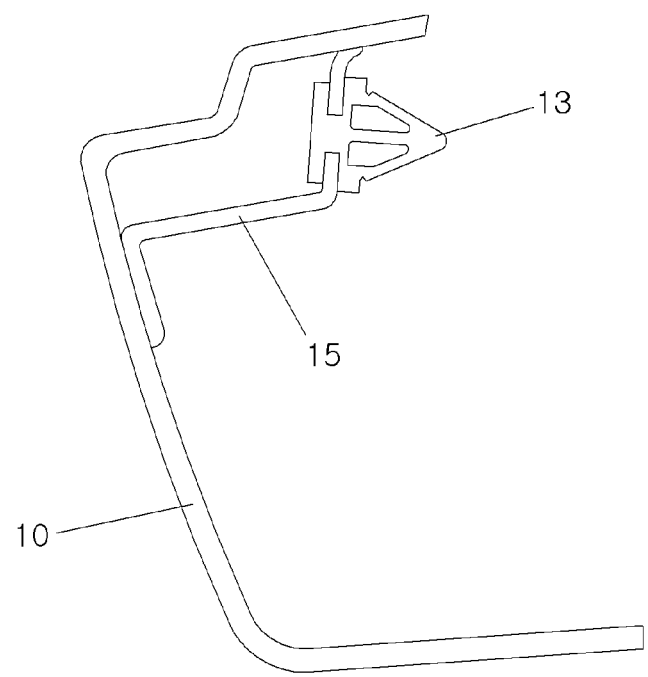
Figure 1D:
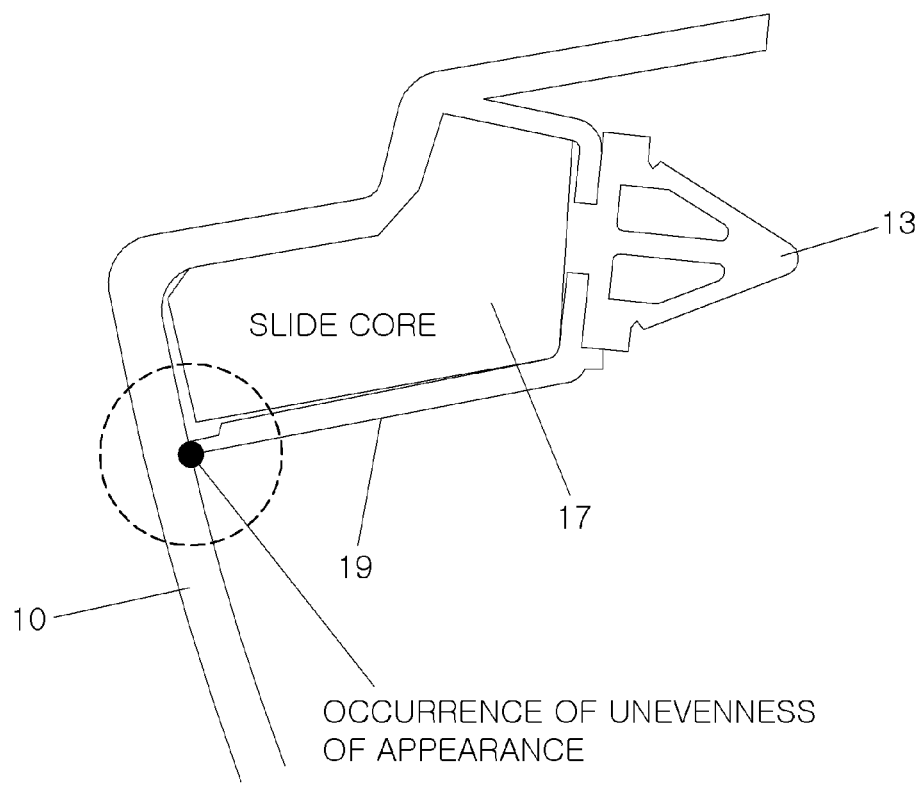
Figure 2A:
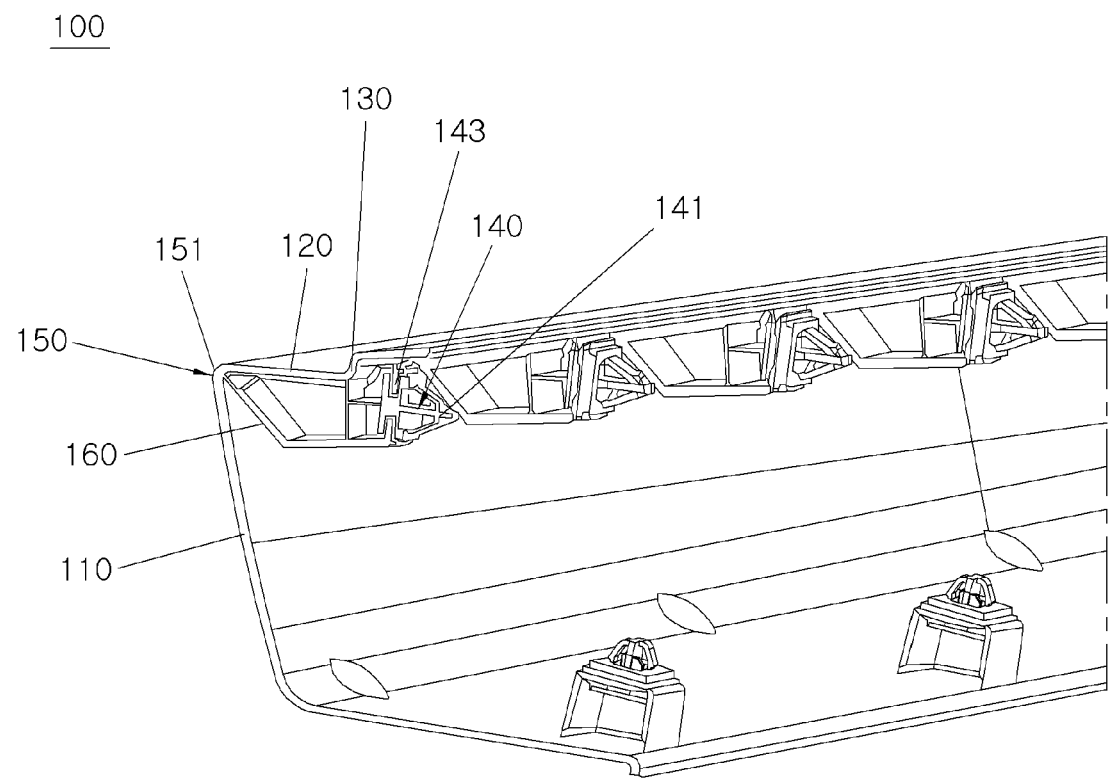
FIGS. 2A and 2B are a perspective view and a cross-sectional view showing a side sill molding according to a first embodiment of the present invention, respectively.
Figure 2B:
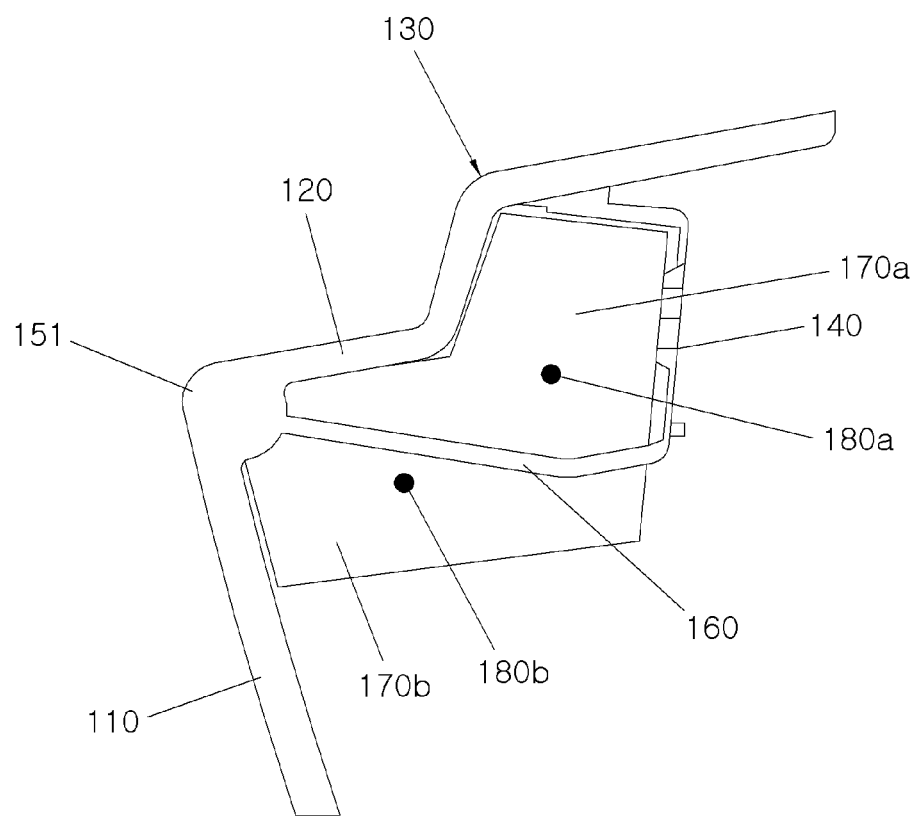

FIGS. 2A and 2B are a perspective view and a cross-sectional view showing a side sill molding according to a first embodiment of the present invention, respectively.

Referring to FIGS. 2A and 2B, a side sill molding 100 according to the first embodiment of the present invention includes a front plate 110 formed to have a length corresponding to a length of a side sill; a top plate 120 connected to an upper end of the front plate 110; a bent part 130 connected to the top plate 120 and having a clip part 140 formed at an inner side thereof; and a rib 160 connecting a lower end of the clip part 140 and a preset portion of the front plate 110.

The front plate 110 is formed to have a length corresponding to the length of the side sill, and a flat surface.

As the bent part 130 is formed at the other end of the top plate 120, a surface facing the side sill (not illustrated) is secured by the bent part 130, such that the clip part 140 may be formed.

The clip part 140 includes a clip 141 and a clip fixing part 143 to which the clip 141 is fixed. Clip parts 140 are formed to be spaced apart from each other by a predetermined interval along a length direction of the top plate 120. Meanwhile, the clip part 140 is a known technology, thus detailed description thereof will be omitted.

The rib 160 is curved at a preset angle from a lower end of the clip part 140 and extends to a portion where the front plate 110 and the top plate 120 meet each other.

Therefore, according to the present invention, it is possible to remove a cause of unevenness that may occur on appearance of a product by not configuring a rib at the appearance of the side sill mounding product.

Figure 3A:
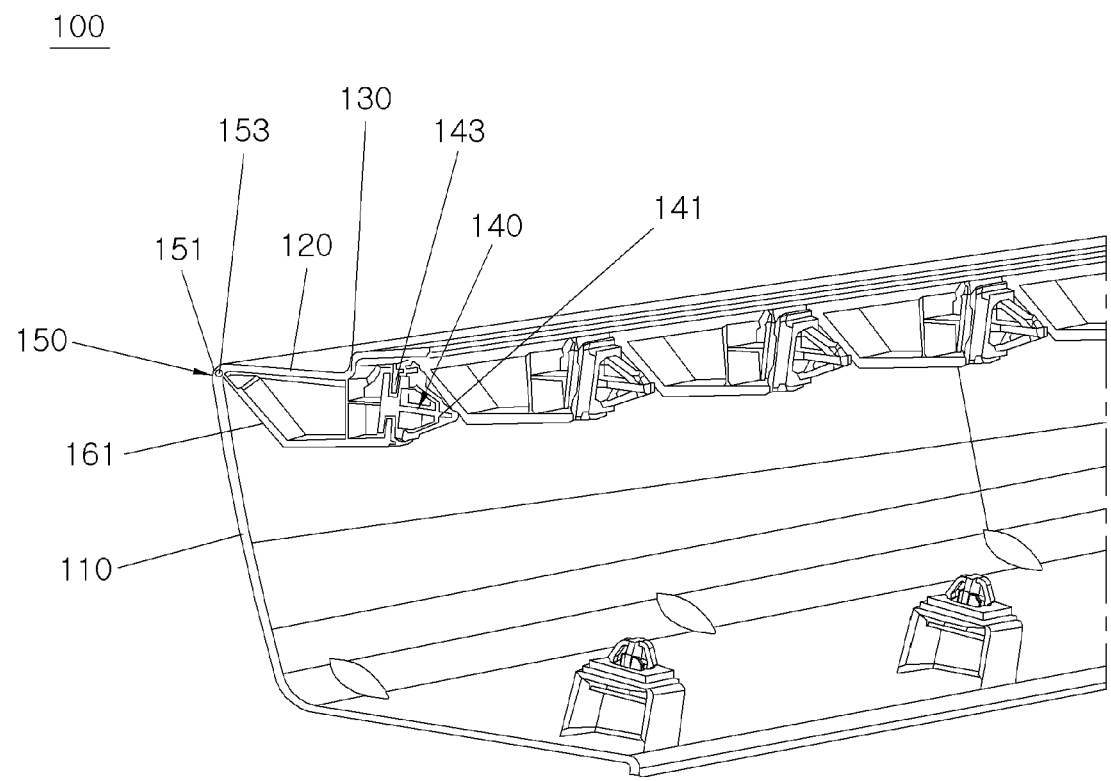
FIGS. 3A to 3C are a perspective view and cross-sectional views showing a side sill molding according to a second embodiment of the present invention, respectively.
Figure 3B:
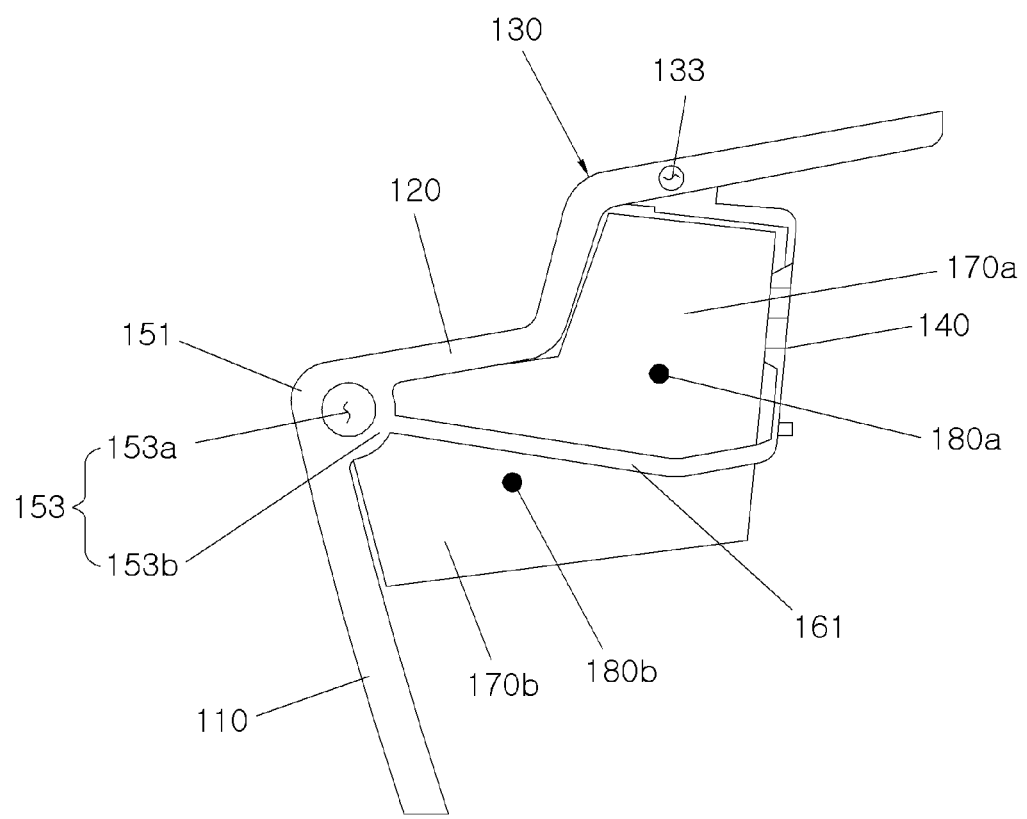
Figure 3C:
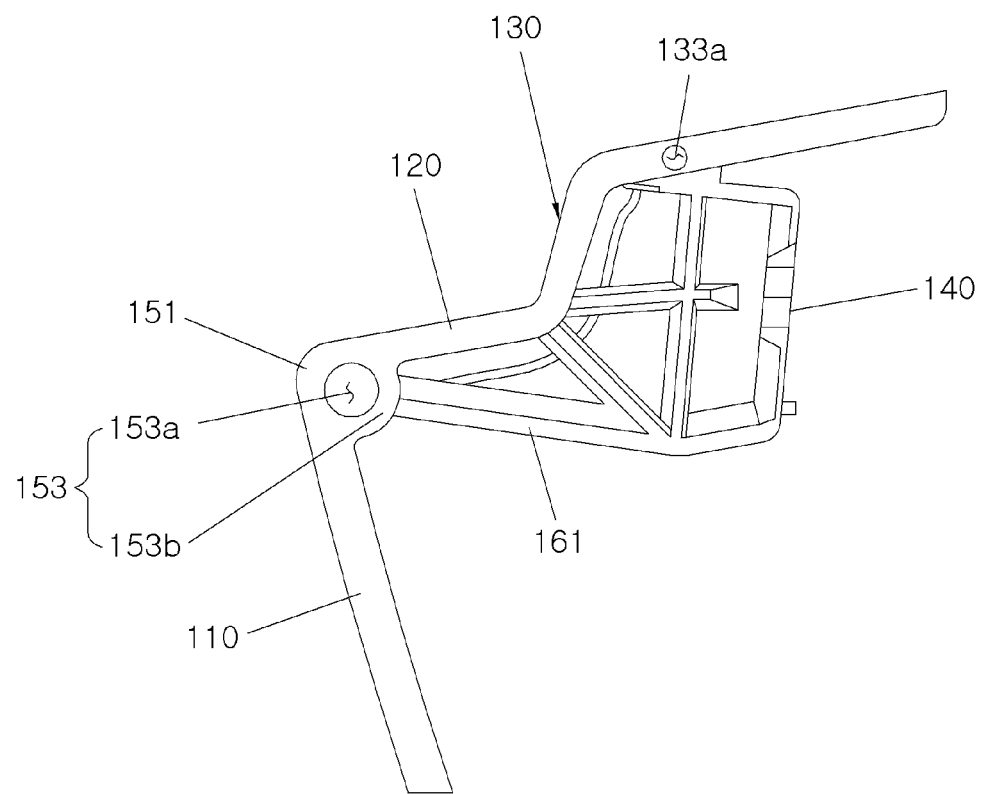

FIGS. 3A to 3C are a perspective view and cross-sectional views showing a side sill molding according to a second embodiment of the present invention, respectively.

Referring to FIGS. 3A to 3C, a side sill molding 100 according to the second embodiment of the present invention includes a front plate 110 formed to have a length corresponding to a length of a side sill; a top plate 120 connected to an upper end of the front plate 110; a bent part 130 connected to the top plate 120 and having a clip part 140 formed therein; gas channel parts 133 and 150 having a hollow part formed therein in a length direction of the side sill; and a rib 160 connecting a lower end of the clip part 140 and the gas channel part.

The gas channel parts 133 and 150 may include a first gas channel part 150 formed at a portion where the front plate 110 and the top plate 120 meet each other, and a second gas channel part 133 formed at the bent part 130, but is not limited thereto. A plurality of gas channel parts may be formed in the side sill molding.

The upper end of the front plate 110 is connected to the top plate 120 through the first gas channel part 150.

The top plate 120 is connected to a rear of the front plate 110 from the upper end of the front plate 110, and one end of the top plate 120 is connected to the front plate 110 through the first gas channel part 150, and the other end of the top plate 120 is connected to the bent part 130.

The first gas channel part 150 includes a connecting part 151 connecting the top plate 120 and the front plate 110, and a hollow part 153 formed in the length direction of the side sill by a gas injection method.

The hollow part 153 may be formed in a circular shape, but is not limited thereto. The hollow part 153 may be formed in a triangular shape, a tetragonal shape, a pentagonal shape, or a hexagonal shape, and may also be formed in an oval shape or a star shape.

Referring to FIGS. 3B and 3C, when the hollow part 153 is formed in a circular shape, one end of the rib 161 is formed toward a center of a hollow hole 153a to be connected to an outer surface 153b of the hollow part 153.

An inner diameter of the hollow hole 153a of the hollow part 153 may be smaller than a vertical length of the clip part 140, and may also correspond to a thickness of the front plate 110 or the top plate 120.

That is, according to the second embodiment of the present invention, the hollow part 153 is formed in the connecting part 151 connecting the top plate 120 and the front plate 110, and the rib 161 is connected to the hollow part 153.

The second gas channel part 133 may be formed at the bent part 130, and formed to be adjacent to the bent part 130.

The second gas channel part 133 is formed as a hollow part by the gas injection method as well, and may be formed in a circular shape, but is not limited thereto and may be formed in a triangular shape, a tetragonal shape, a pentagonal shape, or a hexagonal shape, and may also be formed in an oval shape or a star shape.

Referring to FIG. 3B, the configuration according to the second embodiment of the present invention is formed by the gas injection method and a slide core. Among these, a slide core 170 is to form a shape of a pocket part (not illustrated) formed by a rib, a top plate, a bent plate, etc., and includes a first slide core 170a for forming an upper portion of the rib 161, the top plate 120, the bent plate 130, and the clip part 140, and the second slide core 170b enclosing a lower portion of the rib 161 to form the lower portion of the rib 161.

Further, in order to eliminate mold temperature difference of the pocket part (not illustrated), cooling pipes 180a and 180b may be formed in the first and second slide cores 170a and 170b, respectively.

That is, in the present invention, the gas channel parts 133 and 150 are formed by the gas injection method, and the shape of the pocket part (not illustrated) is formed by the slide core 170.

Therefore, according to the present invention, as a space of the "R" section that is a portion where the front plate and the top plate meet is secured by forming the gas channel part, undercut phenomenon occurring at the time of connecting the rib to the "R" section according to the related art is solved, thereby decreasing post-treatment processes.

Further, according to the present invention, as the gas channel part is formed, a connecting space is secured at an outer surface enclosing the gas channel part, and as a result, a thickness of the rib may be increased to increase rigidity of the rib.

Further, it is possible to secure quality of the appearance of the side sill molding by configuring the rib at the inner side plate of the side sill molding.

Further, as the rib having a preset angle is connected to a portion where the top plate and the front plate meet, it is possible to relieve the stress applied to the front plate, thereby securing appearance quality of the outer surface of the side sill molding.

Figure 4A:
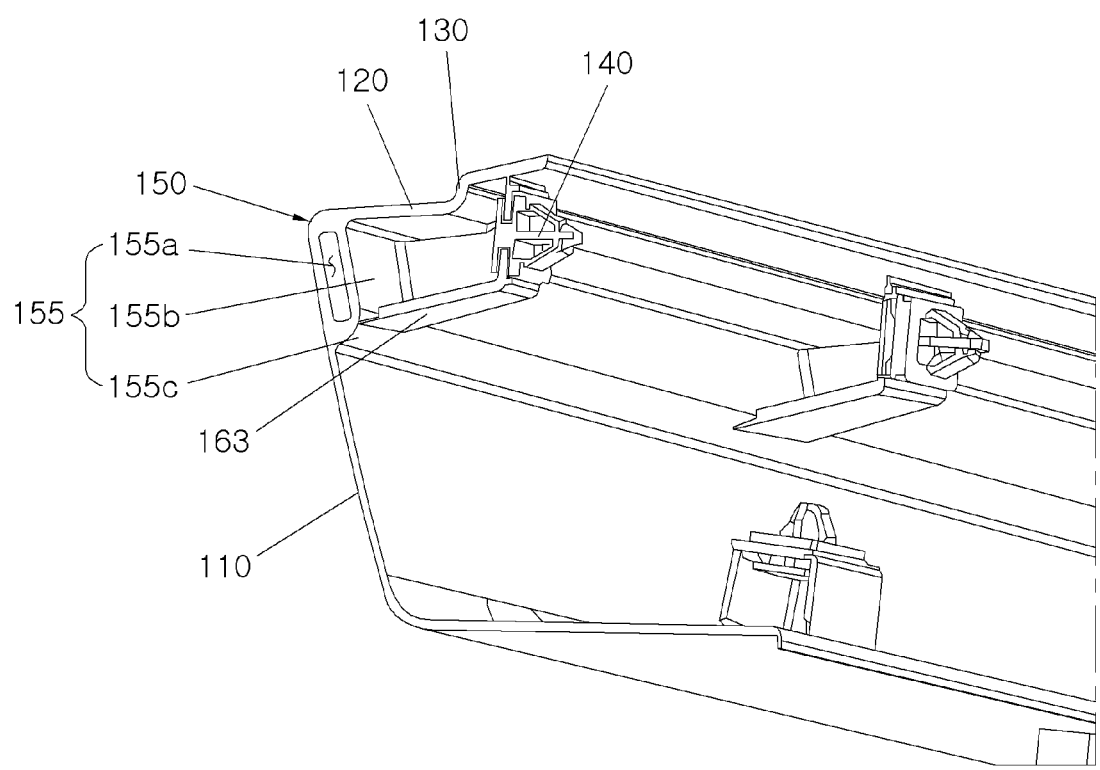
FIGS. 4A and 4B are a perspective view and a cross-sectional view showing a side sill molding according to a third embodiment of the present invention, respectively.
Figure 4B:
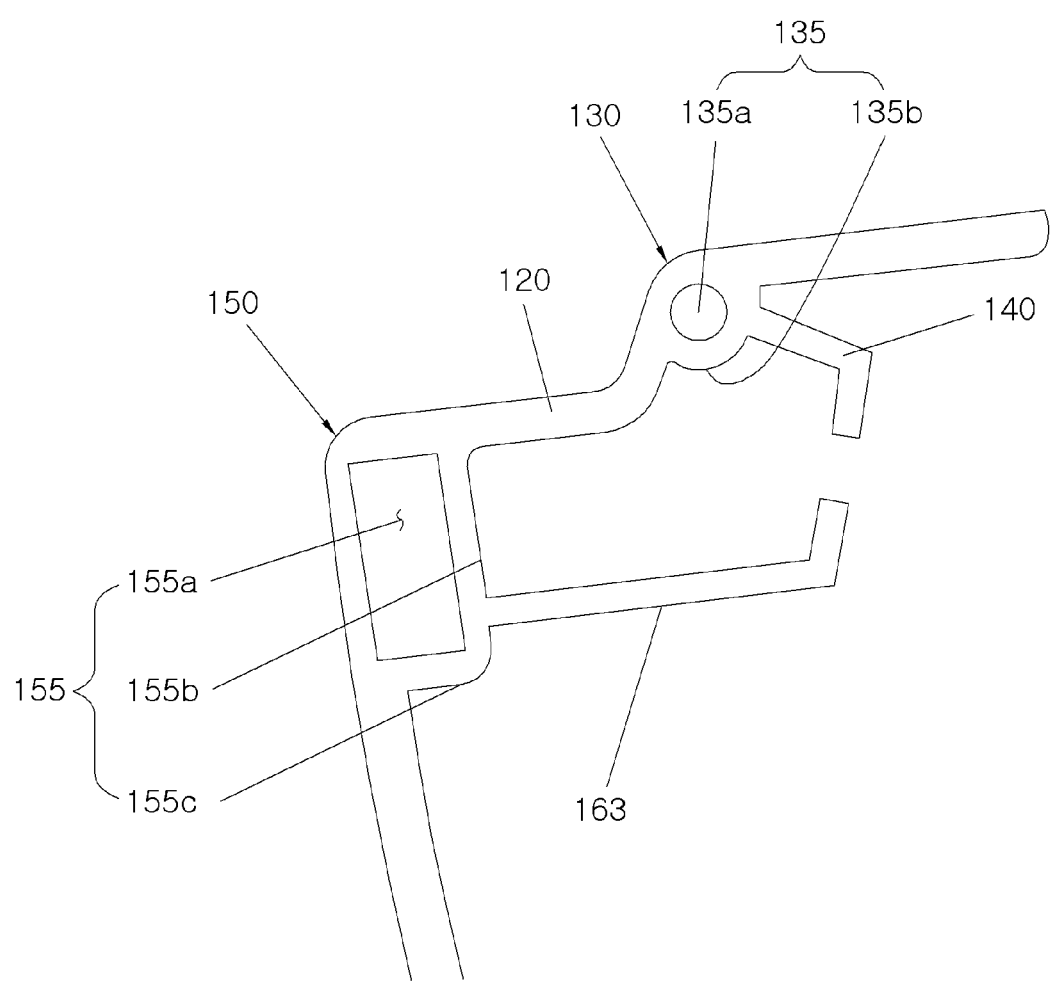

FIGS. 4A and 4B are a perspective view and a cross-sectional view showing a side sill molding according to a third embodiment of the present invention, respectively.

Most configuration of the side sill molding according to the third embodiment of the present invention corresponds to that of the side sill molding according to the second embodiment of the present invention. Therefore, different configuration will be mainly described.

According to the third embodiment of the present invention, a case in which a hollow part 155 of the first gas channel part 150 is formed in a rectangular shape is illustrated, but the hollow part 155 may also be formed in a circular shape or an oval shape.

That is, the hollow part 155 of the first gas channel part 150 according to the third embodiment of the present invention is formed to correspond to the hollow part 153 according to the second embodiment of the present invention. However, a cross-sectional area of the hollow part 155 is larger than that of the hollow part 153 according to the second embodiment of the present invention, such that a rib 163 has a linear shape, rather than a curved shape.

In addition, a second gas channel part 135 according to the third embodiment of the present invention has a shape corresponding to that of the second gas channel part 133 according to the second embodiment of the present invention, and has a cross-sectional area larger that that of the second gas channel part 133 according to the second embodiment of the present invention, but is not limited thereto, and may have the same cross-sectional area depending on a design.

A case in which the second gas channel part 135 according to the third embodiment of the present invention is formed at the bent part 130 is illustrated, and the second gas channel part 135 may include a hollow hole 135a and an inner side part 135b. In this case, the inner side part 135b may be connected to one end of the clip part 140.

The hollow part 155 of the first gas channel part 150 includes a hollow hole 155a, an inner side plate 155b formed to be spaced apart from the front plate 110 by injected gas, and a lower side plate 155c connecting a lower end of the inner side plate 155b and the front plate 110.

The hollow hole 155a may be formed in a rectangular shape similarly to the hollow part 155, and may also be formed in an oval shape.

The hollow hole 155a is formed by the gas injection method, and in the present embodiment, a case in which the hollow part 155 is formed to have a long length in a vertical direction is illustrated, but the hollow part 155 may also be formed in a rectangular shape or an oval shape having a long length in a horizontal direction which is perpendicular to the vertical direction.

One end of the rib 163 is connected to a lower portion of the inner side plate 155b or connected to the lower side plate 155c.

Figure 5:
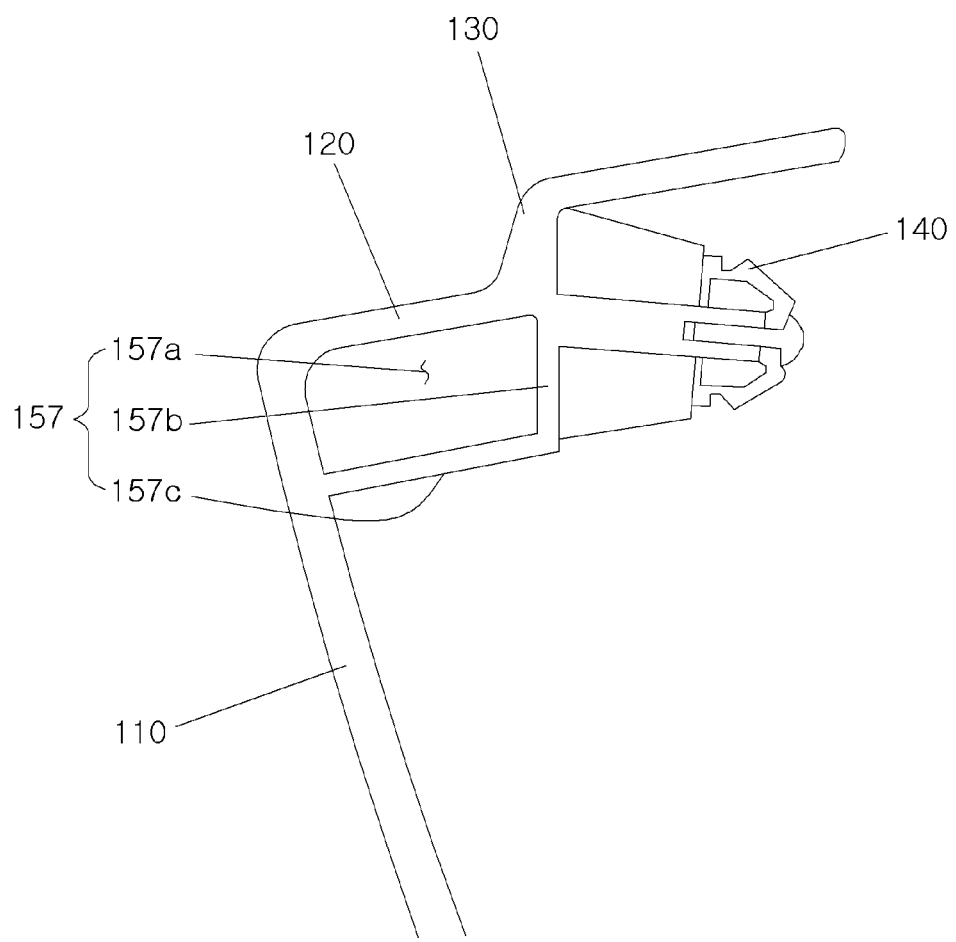
FIG. 5 is a cross-sectional view showing a side sill molding according to a fourth embodiment of the present invention.

FIG. 5 is a cross-sectional view showing a side sill molding according to a fourth embodiment of the present invention.

Most configuration of the side sill molding according to the fourth embodiment of the present invention corresponds to those of the side sill molding according to the second and third embodiments of the present invention. Therefore, different configuration will be mainly described.

A hollow part 157 of the first gas channel part 150 includes a hollow hole 157a, an inner side plate 157b spaced apart from the front plate 110 by a preset interval, and a lower side plate 157c connecting a lower end of the inner side plate 157b and the front plate 110.

According to the fourth embodiment of the present invention, a case in which a long side of the hollow hole 157a extends toward the clip part 140 so that the hollow hole 157a has a rectangular shape is illustrated, and the inner side plate 157b may be integrally formed with the clip part 140. Therefore, in the fourth embodiment of the present invention, a rib is not necessary.

Further, lengths of the hollow hole 157a and the lower side plate 157c may be adjusted so that the hollow hole 157a and the lower side plate 157c do not extend from the front plate 110 to the bent part 130 to be directly connected to the clip part 140.

In addition, according to the fourth embodiment of the present invention, the side sill molding may be formed by only the gas injection method without a slide core, as a result, it is possible to reduce processes and costs for manufacturing while having the same effect as that of the second embodiment.

Figure 6:
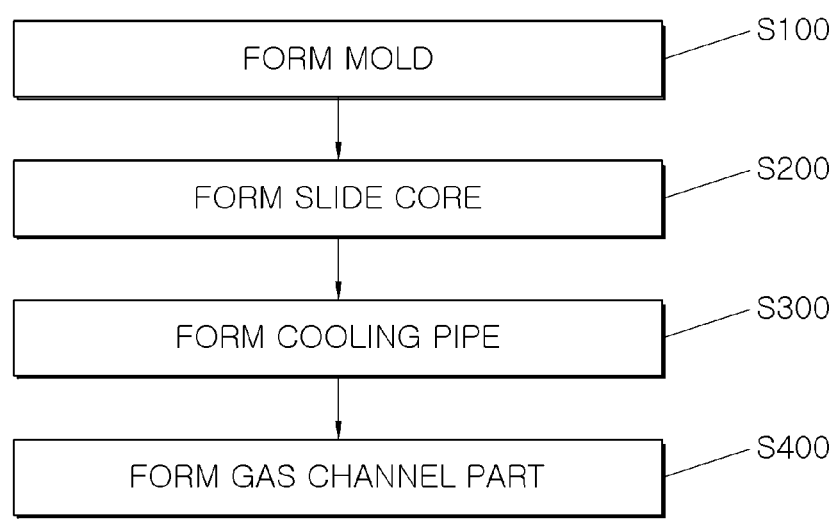
FIG. 6 is a block flow chart showing a manufacturing method of a side sill molding according to an embodiment of the present invention.

FIG. 6 is a block flow chart showing a manufacturing method of a side sill molding according to an embodiment of the present invention.

Referring to FIG. 6, the manufacturing method of a side sill molding according to the present invention includes forming a side sill molding mold (S100); forming a slide core between the side sill molding mold (S200); forming a cooling pipe in a central portion of the slide core (S30); and forming a gas channel part (S40).

The mold for forming the side sill molding according to the present invention may be formed as an upper mold (not illustrated) or a lower mold (not illustrated), and this corresponds to a known technology, thus detailed description thereof will be omitted.

The side sill molding mold is formed first, and the slide core 170 is formed in the mold.

In the forming of the slide core (S200), the slide core 170 is to form the shape of the pocket part (not illustrated) formed by a rib, a top plate, a bent plate, etc.

Thereafter, the gas channel part is formed.

In the forming of the gas channel part (S400), a hollow part of the gas channel part is formed by injecting gas from one end of the side sill molding after injection-molding the side sill molding.

That is, after injection-molding the side sill molding, the gas channel part is formed by the gas injection method at one end of the side sill molding during cooling time of a resin for forming the side sill molding. In this case, the resin corresponding to the gas channel part is discharged from the other end of the side sill molding, and then cut after hardening.

Accordingly, the hollow part may be formed in a length direction of the side sill molding.

According to the present invention, it is possible to remove a cause of unevenness that may occur on appearance of a product by not configuring a rib at the appearance of the side sill mounding product.

Therefore, in accordance with the embodiments of the present invention, as a space of the "R" section that is a portion where the front plate and the top plate meet is secured by forming the gas channel part, undercut phenomenon occurring at the time of connecting the rib to the "R" section according to the related art is solved, thereby decreasing post-treatment processes.

Further, according to the present invention, as the gas channel part is formed, a connecting space is secured at an outer surface enclosing the gas channel part, and as a result, a thickness of the rib may be increased to increase rigidity of the rib.

Further, it is possible to secure quality of the appearance of the side sill molding by configuring the rib at the inner side surface of the side sill molding.

Further, as the rib having a preset angle is connected to a portion where the top plate and the front plate meet, it is possible to relieve the stress applied to the front plate, thereby securing appearance quality of the outer surface of the side sill molding.

The foregoing exemplary embodiments are only examples to allow a person having ordinary skill in the art to which the present invention pertains (hereinafter, referred to as those skilled in the art) to easily practice the present invention. Accordingly, the present invention is not limited to the foregoing exemplary embodiments and the accompanying drawings, and therefore, a scope of the present invention is not limited to the foregoing exemplary embodiments. Accordingly, it will be apparent to those skilled in the art that substitutions, modifications and variations can be made without departing from the spirit and scope of the invention as defined by the appended claims and can also belong to the scope of the present invention.

What is claimed is:

1. A method of making a side sill molding, the method comprising:
    forming a side sill molding mold, the side sill molding comprising a front plate having a length corresponding to a length of a side sill, a top plate connected to an upper end of the front plate, a bent part connected to the top plate and having a clip part formed at an inner side thereof, and a rib connecting a lower end of the clip part and a preset portion of the front plate;
    forming a slide core between the side sill molding mold;
    forming a cooling pipe in a central portion of the slide core; and
    forming a gas channel part.

2. The method of claim 1, wherein forming the gas channel part comprises forming a hollow part of the gas channel part by injecting gas from one end of the side sill molding after injection-molding the side sill molding.

3. The method of claim 2, wherein the hollow part is formed in a length direction of the side sill molding.

4. The method of claim 1, wherein the rib is curved at a preset angle from the lower end of the clip part and extends to a portion where the front plate and the top plate meet each other.

5. The method of claim 1, forming the gas channel part comprises forming a gas channel part that includes a hollow part in a length direction of the side sill.

6. The method of claim 5, wherein forming the gas channel part comprises forming a first gas channel part formed at a portion where the front plate and the top plate meet each other.

7. The method of claim 6, wherein forming the gas channel part comprises forming a second gas channel part formed at the bent part.

8. The method of claim 6, wherein the first gas channel part includes an inner side plate formed to be spaced apart from the front plate by injected gas, and a lower side plate connecting a lower end of the inner side plate and the front plate.

9. The method of claim 8, wherein one end of the rib is connected to a lower portion of the inner side plate.

10. The method of claim 8, wherein one end of the rib is connected to the lower side plate.

11. The method of claim 8, wherein the clip part is directly connected from the inner side plate.

12. The method of claim 5, wherein the gas channel part is formed at the bent part.

* * * * *